(12) United States Patent
Preissler

(10) Patent No.: US 6,648,599 B2
(45) Date of Patent: Nov. 18, 2003

(54) METHOD AND CONTROL ARRANGEMENT FOR ADJUSTING A FLAP THAT IS PIVOTALLY SUPPORTED IN A ROTOR BLADE OF A HELICOPTER

(75) Inventor: Dieter Preissler, Munich (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 85 days.

(21) Appl. No.: 10/114,168

(22) Filed: Apr. 1, 2002

(65) Prior Publication Data

US 2002/0141867 A1 Oct. 3, 2002

(30) Foreign Application Priority Data

Apr. 3, 2001 (DE) .......................................... 101 16 479

(51) Int. Cl.[7] ............................................. B64C 27/615
(52) U.S. Cl. ............................. 416/1; 416/23; 244/215; 244/75 R; 310/330
(58) Field of Search ................................ 416/1, 23, 24; 244/21 S, 75 R, 213, 214, 216, 217; 310/330, 328, 331; 60/528, 529

(56) References Cited

U.S. PATENT DOCUMENTS 6,231,013 B1 * 5/2001 Jaenker .................... 244/215
6,295,006 B1 * 9/2001 Kohlhepp .................. 340/946
6,354,536 B1 * 3/2002 Torok et al. ................ 244/39

FOREIGN PATENT DOCUMENTS

EP          1035015         9/2000

* cited by examiner

Primary Examiner—Edward K. Look
Assistant Examiner—J. M. McAleenan
(74) Attorney, Agent, or Firm—W. F. Fasse; W. G. Fasse

(57) ABSTRACT

A force transmitting linkage connects a piezoelectric actuator to a flap that is pivotably connected to a helicopter rotor blade. In a flap actuation control arrangement and method, a force transducer senses the force being transmitted through the linkage and generates a corresponding actual force signal, a flap position sensor senses the position of the flap and generates a corresponding actual flap position signal, a first controller receives a desired flap position signal and the actual flap position signal and responsively thereto generates a reference signal, and a second controller receives the reference signal and the actual force signal and responsively thereto generates a control signal that is provided to the piezoelectric actuator. This provides a real time flap actuation control with respect to highly dynamic forces as well as friction forces acting on the flap.

22 Claims, 3 Drawing Sheets

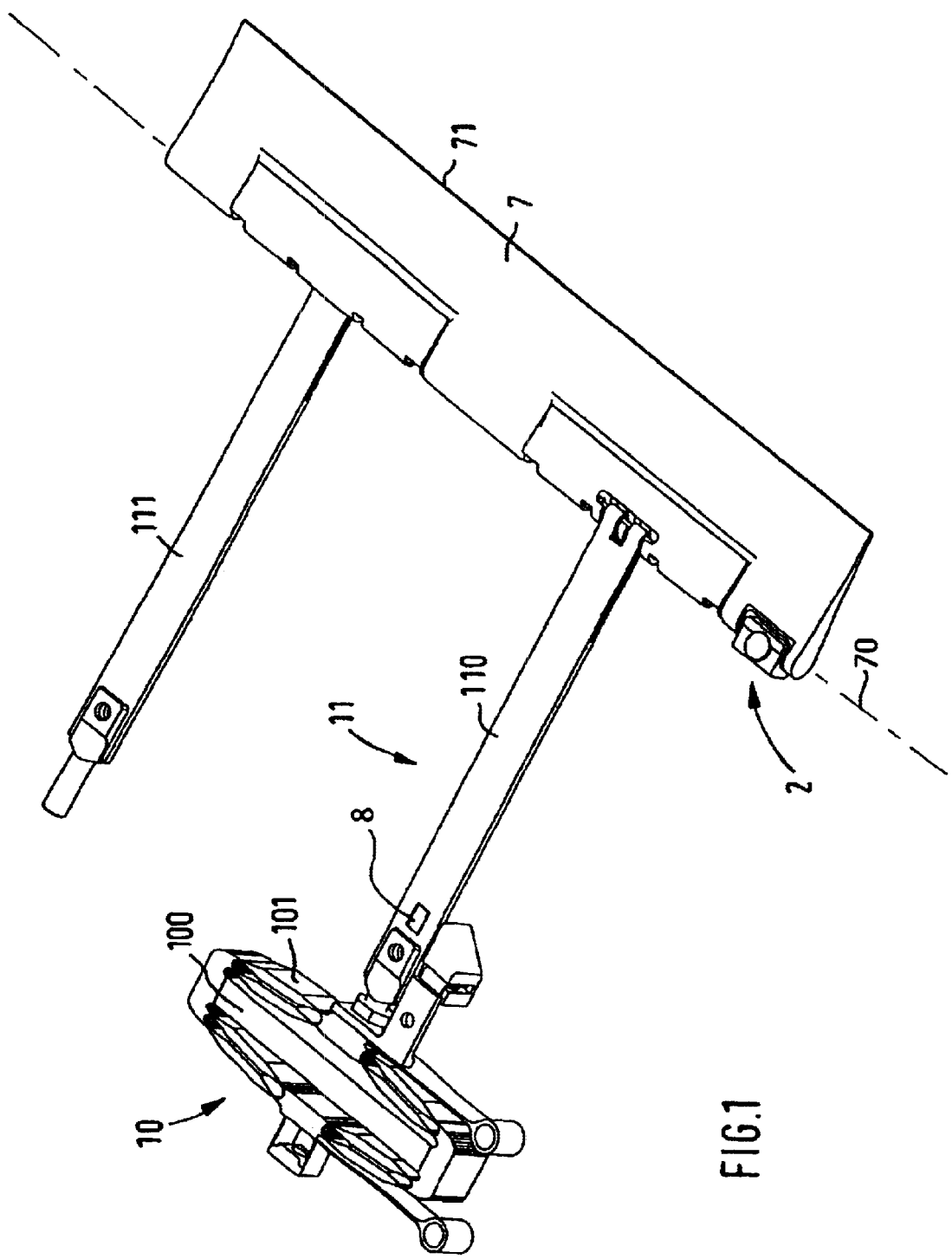

METHOD AND CONTROL ARRANGEMENT FOR ADJUSTING A FLAP THAT IS PIVOTALLY SUPPORTED IN A ROTOR BLADE OF A HELICOPTER

PRIORITY CLAIM

This application is based on and claims the priority under 35 U.S.C. §119 of German Patent Application 101 16 479.3, filed on Apr. 3, 2001, the entire disclosure of which is incorporated herein by reference.

FIELD OF THE INVENTION

The invention relates to a method and a control arrangement for actuating and controlling a flap that is pivotally connected to the rotor blade of a helicopter, using a piezoelectric actuator, a force transmitting linkage connecting the actuator to the flap, and a control circuit arrangement that controls the actuator.

BACKGROUND INFORMATION

The rotor system of a helicopter is the cause of the noise and the vibrations in the cabin. Simultaneously, the rotor system also generates a high exterior noise level, especially during the landing approach flight. These noise emissions and vibrations cause a drastic reduction of comfort for the helicopter passengers and are disadvantageous for the environment. In the further development of the helicopter construction, these noise emissions and vibrations shall be significantly reduced. One development in this regard involves the use and the operation of a flap on the lift generating blade. The pivotable flap is arranged in the area of the profile leading edge and/or the profile trailing edge of the blade, where the flap is pivotally arranged about its pivot axis.

The application of a flap in or on the rotating rotor blade of a rotary wing aircraft is clearly distinguished from the flaps of a rigid wing of a fixed wing aircraft. These two fields of application cannot be overall or globally compared with one another. The flap in the rotating rotor blade is subjected to unusually strong loads or demands. These loads or demands with respect to the flap result from vibrations of the rotating rotor blade, dynamic loads from the centrifugal force on the rotating rotor blade, and dynamic loads as a result of effective aerodynamic forces.

This observation applies for basically all structural components or assemblies that are connected with the rotor blade.

The published European Patent Application EP 1,035,015 A2, paragraphs 0036 and 0037, describes a flap drive with a flap, which are installed in a rotor blade, and an electrical regulating or control arrangement for the flap drive. The flap drive consists of a piezoactuator, and a movable link frame coupled with the piezoactuator. The link frame is connected by force transmission means with the pivotally supported flap. The piezoactuator is secured on one side on the inner structure of the blade, and the flap is pivotally supported in the structure of the blade. At the time of manufacturing the rotor blade, simultaneously also the flap drive and the flap must be installed in the rotor blade. The piezoelement, as the central core element of a piezoactuator, takes over the function of an actuator member, which can adjust the flap from a base or initial position along a displacement path or a prescribed adjustment angle. The actuating or adjusting signal (adjusting value Y) is received by the piezoactuator from the electrical control arrangement.

The known control arrangement is connected with measuring elements. One measuring element senses the angle of the flap adjustment. That corresponds to the control output value, which is fed back to the control arrangement as a feedback value. In this known arrangement, any bearing play that may be present in the frame construction of the actuator can be counteracted or compensated in view of the feedback signal. However, the force/displacement dependence of the piezoelement is thereby not removed or regulated-out. The known technical solution also does not describe how the control arrangement can react to interference values which result from the above described demands that act on the flap. Interference values cannot satisfactorily be regulated-out or compensated.

In the use of a piezoactuator as an actuating or adjusting element, it is known that a strict proportionality exists between the applied electrical voltage and the strain elongation of the piezoactuator. Due to this constant dependence, it is known to regulate or control the required angular adjustment of the flap by controlling an electrical voltage that is to be applied to the piezoactuator. That makes the control arrangement. Thus, in the following discussion, a flap drive with a piezoactuator will be considered.

In practice it has been found, however, that an exclusive regulation or control of the angle of the flap does not achieve the desired results. This is caused by a plurality of influences or effects, which interferingly influence the adjustment of the flap.

Such influence values are aerodynamic forces, for example caused by the flow around the rotor blade, the variation of the incident flow of the rotor blade, effective air vortices, trailing vortices as a result of blade vortex interferences, in short called BVI (blade vortex interaction), as well as mechanically active influence values such as the bearing friction, and the time variation of the bearing friction of the flap bearings or of the bearings in the flap drive. Some of these influence values (also called interference values) act on the flap in a highly dynamic and rapidly varying manner.

These interference values are not foreseeable or predictable and are quantitatively difficult to determine. A high dynamic of the interference values also requires a high frequency (approximately 50 to 100 Hz) of the actuating manipulation which regulates-out the interference values relative to the flap. Dynamically acting interference values have previously been neglected in the prior art in connection with the regulation or control of a flap. Due to these technical difficulties, it is problematic to embody a precisely functioning regulation or control. An iterative optimization of the adjusting or actuating value, or the search for an actuator (adjusting element) with other functional characteristics, does not achieve improved results.

SUMMARY OF THE INVENTION

In view of the above, it is an object of the invention to develop a regulation or control method and the corresponding regulating or control arrangement, in order to ensure a precise adjustment in all necessary angular positions of a flap in the rotor blade of a helicopter during the flight operation thereof. The invention further aims to avoid or overcome the disadvantages of the prior art, and to achieve additional advantages as apparent from the present specification.

The above objects have been achieved according to the inventive method, in that a measuring element senses or detects the actuating force on the force transmission means between the piezoactuator and the flap, the actuating force signal is provided as a measurement signal to a servo following controller that is subordinated to the primary control arrangement, the servo following controller receives the controller output value of the primary control arrangement as a reference value, the servo following controller then forms a controller output value that is provided to the piezoactuator, and the flap angle set-point or nominal value transducer of the control arrangement receives a pre-setting of the nominal value from an external regulator or controller.

The above objects have further been achieved according to the inventive apparatus, in that a measuring element is arranged on the force transmission means and is connected with a controller subordinated under the primary control arrangement, this controller is connected with the piezoactuator, and the control arrangement is connected with an external controller by means of a set-point or nominal value transducer. In a further embodiment, the force measuring element is a strain gage. This measuring element provides a corresponding electrical measurement signal in a feedback loop to the controller that regulates the force measurement value and that operates as a servo following controller with respect to the control arrangement.

The invention makes it possible to effectively regulate-out highly dynamically effective aerodynamic forces as well as friction forces in the mechanism of the force transmission to the flap and in the flap bearing support. These interference values are regulated-out in real time. This is achieved in that the invention does not wait until the control difference between the actual flap angle and the rated or desired flap angle triggers a control arrangement that regulates the angle measurement value to carry out the intended adjusting manipulation, but instead the invention provides an additional immediate regulation or control of a force measurement value in a servo following controller. Thereby, the actuating value of the angle control of the master or reference controller can be maintained.

BRIEF DESCRIPTION OF THE DRAWINGS

In order that the invention may be clearly understood, it will now be described in connection with an example embodiment, with reference to the accompanying drawings, wherein:

FIG. 1 shows a schematic of an apparatus for the adjustment of a flap that is pivotally supported in a helicopter rotor blade;

Figure 1A:
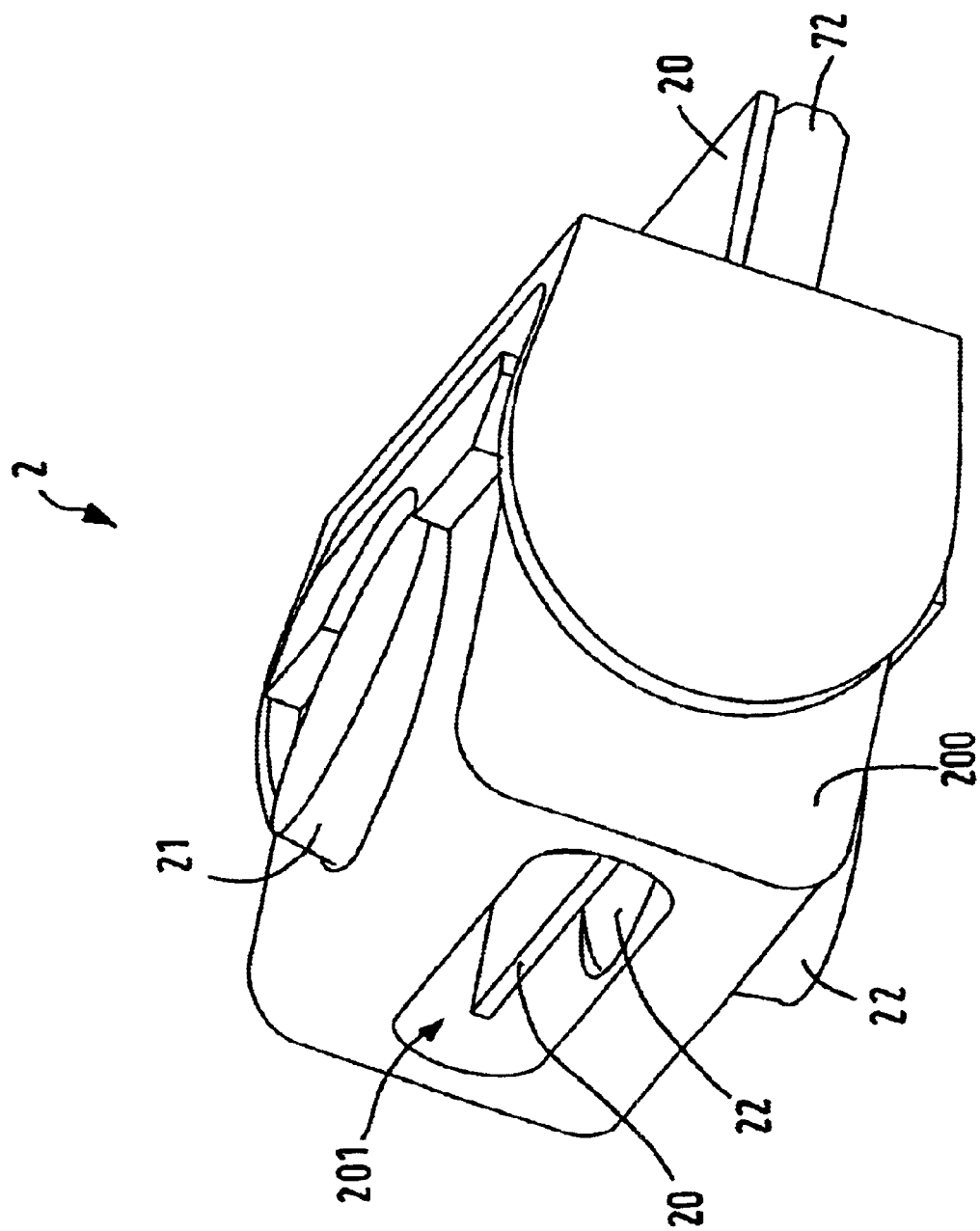
FIG. 1A shows a sensor device for sensing the angle that the flap traverses or takes up during the adjustment.

DETAILED DESCRIPTION OF PREFERRED EXAMPLE EMBODIMENTS AND OF THE BEST MODE OF THE INVENTION

FIG. 1 shows an apparatus for adjusting, i.e. actuating, a flap that is pivotally supported in the rotor blade of a helicopter. For the function of the invention it is insignificant whether a flap drive is supported in the structure of the blade or is supported in an encapsulated module, which is then integrated into the structure of the blade. The illustration is schematic, i.e. helicopter and rotor blade are not explicitly shown, but rather only the flap 7 with the flap drive 10 that is to be controlled. The flap 7 is supported to be pivotable in an angular segment or range about a pivot axis 70 in a support bearing of the blade. The flap can be smoothly or continuously set to any angular position within this angular segment range. The flap web or vane points in the direction of the profile edge of the blade, whereby in the example embodiment, the flap web or vane 71 is oriented in the direction toward the profile trailing edge. The application of a flap in the area of the profile leading edge is, however, also possible.

The flap drive is realized by a piezoactuator 10. In the simplest case, the piezoactuator 10 consists of a piezoelement 100 with a movable frame 101 and a force transmission means or linkage 11, e.g. the tension strut or tie bar 110. A second tension strut 111 is connected with a spring means (not shown) which is held by the structure of the blade. In another example embodiment, the spring means is replaced by a second piezoactuator. The present example is, however, a simpler and fully functional solution. The use of a second piezoactuator has no influence on the invention.

From the piezoactuator 10, which is held and supported in the blade, the actuating or adjusting force is transmitted by means of strut 110 onto the flap 7. The strut is preferably a flexurally stiff one. Thus, the strut pulls or pushes, i.e. can transmit both tension and thrust forces. In the present example embodiment, the strut will be referred to as a "tension strut" because it is most important that the strut 110 transmits tension forces to "pull" the flap in one direction, while the other tension strut 111 transmits tension forces to "pull" the flap in the opposite direction. Generally in this regard, the linkage 11 comprises a link member that may be a stiff rod or bar, or a flexible rod or cable.

The present example embodiment using two oppositely-acting tension struts 110, 111, is better suited and simpler in practical operation, in comparison to the prior art. Starting from a fictitious center point line of the pivot axis 70, the two tension struts 110, 111 engage or couple onto the pivot axis 70 of the flap 7 eccentrically offset relative to the center point line. The two tension struts 110, 111 are offset by 180° relative to one another. The spring means and the piezoactuator 10 act contrary to one another in a pre-stressed condition and achieve a force balance, which holds the flap in a pre-stressed condition in a (displacement/angle) basic initial adjustment position or neutral position.

If a further straining elongation of the piezoactuator 10 takes place, then by means of the movable frame 101, its tension strut 110 is pulled farther away from the flap 7. The flap is adjusted out of the basic initial position into a desired working position, i.e. to a selected angle. If the flap is then to be moved away from this working position, in the direction toward the basic initial position, then the piezoactuator 10 must contract somewhat. Its tension strut 110 pushes (or simply relaxes) while the tension strut 111 of the spring means pulls until the flap reaches the basic initial position.

Interference values have an influence on this adjusting process, of which the effect will be described at a later point.

In the positioning or adjusting of the flap, it is important to sense the actual angle that is actually taken up by the flap, and to pass it on as an electrical measurement signal to the control arrangement. The actual angle shall be continuously sensed. The actual angle could equivalently also be represented as an actual displacement. Due to trigonometric function relationships between an angle and the adjustment displacement allocatable thereto, the flap angle can always also be determined and represented as a displacement path distance. Both possibilities are equivalent. For reasons of simplification, in the following, only the determination and representation of the angle of the flap will be discussed. Also other physical principles for determining a displacement or angle are useable. The measuring element or flap position sensor 2 for sensing an angle variation should preferably, however, work in a contact-less manner relative to the flap.

FIG. 1A shows an example of a sensor device for sensing the angle that the flap traverses or takes up during the adjusting out of a basic initial position. A metal sheet embodied as a small metal vane 20 is rigidly connected with the structure 72 of the flap 7. For the connection with the metal vane, the flap should have a defined angular position. That may, for example, be a basic initial position (0°) of the flap. Thereby, the flap vane is located flushly in or along the contour of the blade trailing edge. Above and below the metal vane 20, but spaced relative to the metal vane, there is located respectively one electrical coil body 21, 22. The two coil bodies 21, 22 are arranged in a mounting 200 that is fixed to the structure of the rotor blade in such a manner so that a measuring gap 201 is formed respectively between the coil bodies and the metal vane, and an alternating magnetic field builds up between them after application of an alternating voltage. Both coil bodies 21, 22 are connectable with an electronic demodulator (not shown) by means of an electronic circuit (not shown). The electronic demodulator now generates a direct (DC) voltage which behaves proportionally to the angle of the metal vane 20 between the coil bodies 21, 22. The use of two coil bodies makes it possible to realize a linear characteristic operating function of the measuring element or flap position sensor 2. However, as a simplified embodiment, the use of only one coil body would also be possible.

An absolute value transducer (absolute pulse transducer) is, however, alternatively usable as measuring element 2 for determining the flap angle, whereby this transducer is mechanically coupleable with the pivot axis of the flap. In an absolute value transducer, the angular position is contained as digital information on its index plate. Thereby, after being switched on, the exact position of the pivot axis is available as a digital bit pattern. The index plate of the absolute value transducer is divided into several tracks, which are each respectively sensed or sampled by an optical sensor, which in turn converts the result into an electrical measurement signal, that is available to a control arrangement.

A further alternative embodiment of the measuring element or flap position sensor 2 involves sensing the displacement, which is proportional to the angle of the adjustment. This displacement can advantageously be detected from the motion of the tension strut 110 of the piezoactuator 10. Two coils are spaced apart relative to each other and are arranged in a fixedly located mounting, independent of the tension strut 110, in such a manner so that they form a measuring gap therebetween. A correspondingly dimensioned metal sheet, which is connected with the tension strut 110, is arranged in this measuring gap. The motion of the tension strut 110 moves the metal sheet continuously between two end positions. After application of an alternating voltage to the two coil bodies, a magnetic alternating field is built up. For example an electronic demodulator generates a direct (DC) voltage, which behaves proportionally to the position of the metal sheet in the measuring gap.

Figure 2:
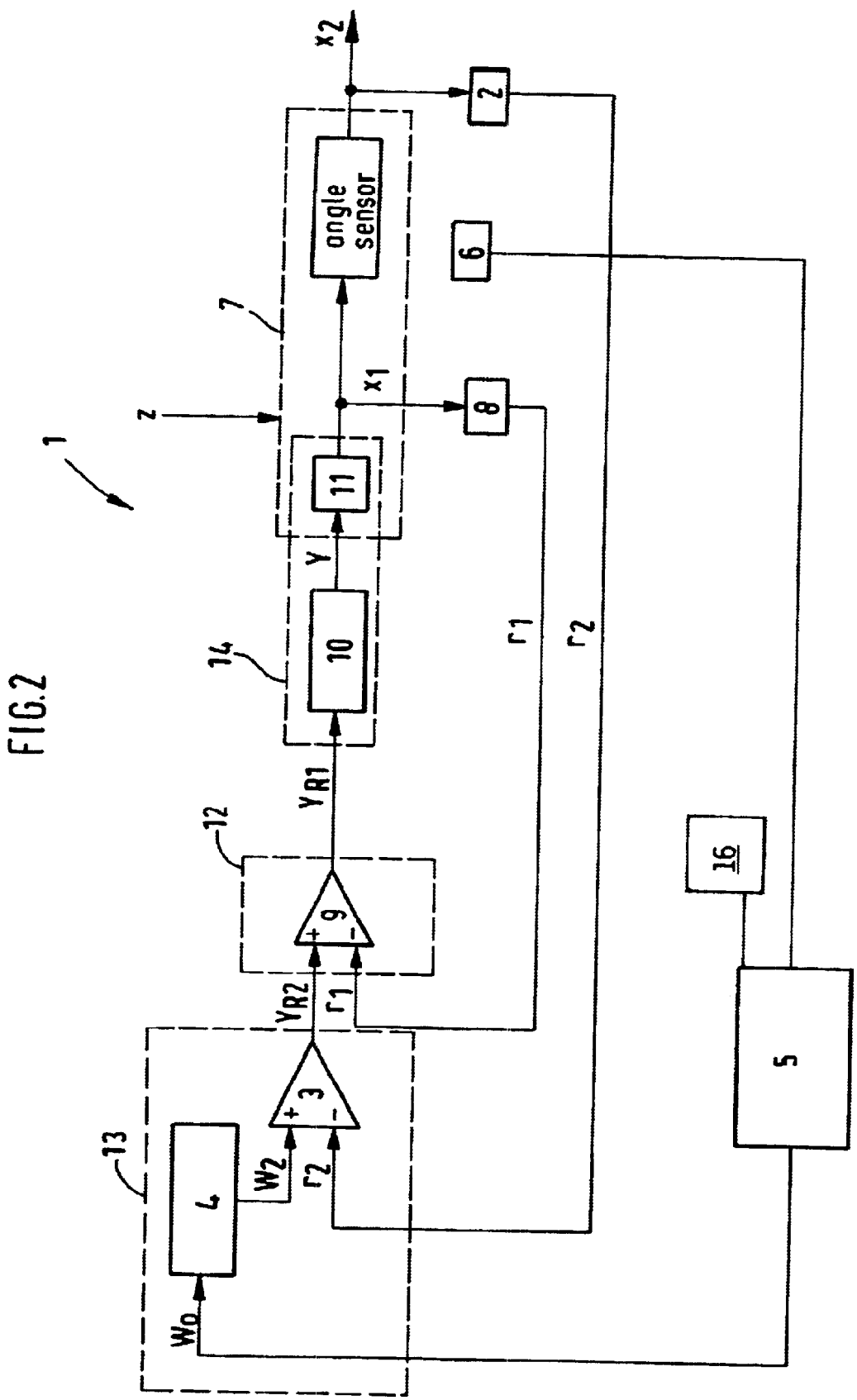
FIG. 2 shows the control arrangement for adjusting the flap that is pivotally supported in the rotor blade.

FIG. 2 shows a regulation or control arrangement 1 for controlling the actuation or adjustment of the flap 7 that is pivotally supported in the rotor blade. The flap vane is thereby pivoted about the pivot axis 70. The identified example embodiments for displacement/angle measuring elements can find application for a control arrangement 1 for the flap adjustment. In the following, only one flap position sensor or angle measuring element 2 will be considered. The measurement signal $r_2$ acquired by the angle measuring element 2 is provided to an input of a primary regulating or control arrangement 13 comprising a primary amplifier or controller 3. This controller 3 receives its reference value $w_2$ from an angle set-point or nominal value transducer 4. In the controller 3, a controller output value $Y_{R2}$ is formed from the prescribed reference value $w_2$ and the back-fed measurement signal $r_2$.

The angle set-point or nominal value transducer 4 receives the nominal or rated value of the desired blade position or blade angle setting from a so-called external controller 5. This external controller 5 contains control algorithms and/or circuitry for the reduction of BVI, for the reduction of vibrations in the helicopter cabin, and for the minimization of the flow resistance of the helicopter (and particularly the rotor blades thereof) in cruise flight. For this purpose, the external controller 5 is connected with a measuring element 6, or correspondingly several thereof. Such measuring elements 6 sense sound noises due to BVI or vibrations of the cabin structure, or the flow resistance. The external controller can also receive pilot control commands via a flight control device 16.

The controllable flap 7 in the rotor blade is adapted to reduce BVI and/or to reduce vibrations in the cabin and/or to minimize the flow resistance of a rotor blade in cruise flight. Dependent on the pre-set control input of the pilot relative to the external controller 5, this provides a corresponding reference value $w_0$ as a nominal or rated value of the desired flap angle, to the angle set-point or nominal value transducer 4. This nominal value pre-setting input through the external controller 5 is important, for example, for the reduction of BVI, which becomes necessary especially during the landing approach flight. In the landing approach flight, the flap in the rotor blade should constantly be controlled in such a manner that the rotating rotor blade can, in a short time, escape from a trailing vortex (BVI). Upon reaching a flight condition with BVI, the external controller 5 makes a corresponding nominal value pre-setting input.

Aerodynamic forces acting on the flap 7 and friction forces acting on the force transmission means 11 as well as in the bearing supports of the flap 7 are interference values which undesirably influence the angle to which the flap 7 will actually be adjusted. The result is that the adjusting or positioning manipulation leads to a faulty angular adjustment of the flap 7, i.e. such that the actual flap position does not correspond with the desired nominal flap position.

An exclusive angle adjustment, with only one control arrangement, must compensate for this adjustment error with a renewed adjusting manipulation. That is disadvantageous because it is slow and imprecise in its reaction. Especially the aerodynamic forces such as vortices or trailing vortices from BVI are highly dynamically active forces. The invention matches or adapts the control arrangement 13 to the force dynamics. Despite high dynamics of the effective forces, the invention is able to successfully minimize the time delay (dead time) from the point at which a highly dynamic interference value z becomes effective until reaching the proper required adjustment angle of the flap 7. This is achieved in that the invention does not wait until the angular control difference of the control arrangement 13 triggers a correction of the intended adjustment manipulation, but instead, in that the adjustment value of the angle control can be maintained through an additional immediate force control.

In this regard, the controller output value $Y_{R2}$ of the primary control arrangement 13 is provided as a reference input to a further secondary controller, a so-called force controller 9. The force controller 9 further receives a feedback signal from a measuring element or force measuring transducer 8 which senses the interfering forces influencing the angle adjustment. As already explained, the significant interference values z (aerodynamic forces and friction forces) relative to the flap adjustment have various different magnitudes and dynamics, and have different locations of effectiveness. Nonetheless, it is possible for the invention to find, in the adjusting arrangement 14 (including actuator 10 and linkage 11), a suitable measuring location and a suitable measuring element, so that the totality of the significant interference values z can be exactly detected by measurement technological means with only one measuring element.

This measuring element or force measuring transducer 8 senses the forces that act as resistances on the flap 7 as a result of effective aerodynamic forces, but also friction forces in the path from the piezoactuator 10 to the flap 7, as well as friction forces in the bearing support of the flap 7 itself. This measuring element 8 for sensing the actuating force is arranged on the force transmission means or linkage 11, advantageously on the tension strut 110 (FIG. 1) of the piezoactuator 10. The force measuring element 8 is, for example, a strain gage which is arranged on the surface of the tension strut. An adjustment angle of the flap 7 is allocatable to each motion of the tension strut. The tension force or thrust force of the tension strut 110 is a measure for the actually achievable angle of the flap 7. More importantly, the force that is measurable in the tension strut 110 is the force that is necessary to overcome the sum totality of all forces that are resisting or counteracting the intended positioning of the flap (e.g. including aerodynamic forces and friction forces). The tension or thrust force measured with the strain gage is thus that force that is actually necessary for adjusting the flap 7 by overcoming the resistance of interfering forces (aerodynamic forces, friction forces). This tension or thrust force is measured by strain gages as the measuring element 8 and is converted into an electrical measurement signal. This electrical measurement signal corresponds to a feedback value $r_1$, which is fed back to the feedback input of the force controller 9.

The controller output value $Y_{R2}$ of the control arrangement 13 is provided as a reference value to the reference input of the force controller 9. Thus, the force controller 9 corresponds to a servo following controller 12 within a cascade control. From the feedback value $r_1$ and the controller output value $Y_{R2}$, which acts as reference value, the force controller 9 forms a controller output value $Y_{R1}$. This controller output value $Y_{R1}$ is provided further as the control signal to the piezoactuator 10 of the adjusting or actuating arrangement 14. The controller output value $Y_{R1}$ corresponds to an electrical resting voltage or open circuit voltage that is to be applied to the piezoelement 100. In this context, the piezoelement 100 is already pre-stressed in a known manner. The resting or open circuit voltage that is to be applied achieves, for example, a strain expansion of the piezoelement 100. The piezoelement 100 is the actual drive of the piezoactuator 10. This strain expansion of the piezoelement 100 is a measure for the actuating or adjusting value Y, which acts on the force transmission means 11. The force transmission means 11 is one of the tension struts which forms the connection between the piezoactuator 10 and the flap 7. According to the known construction of a piezoactuator 10, the strain expansion of the piezoelement causes a tension in the tension strut, so that the flap 7 is adjusted or moved. The tension force is detected as control value $x_1$ by the measuring element 8, and is fed back as feedback value $r_1$ to the force controller 9.

The measuring element 2 detects the actual flap angle as control value $x_2$ and feeds this, converted into an electrical measurement signal, as feedback value $r_2$, back to the primary controller 3. At its reference input, the primary controller 3 is connected to the flap angle set-point or nominal value transducer 4, which receives the nominal values as reference value $w_0$ prescribed from the external controller 5. The control arrangement 13 operates as a master controller or reference controller for the subsequent servo following controller 12.

When the master or reference controller outputs its controller output value $Y_{R2}$ as a reference value for the servo following controller 12, thereby an influence is exerted on the formation of the adjusting or actuating value Y (adjusting or actuating signal) through the servo following controller 12. The adjusting or actuating value Y is indirectly a measure for the adjusting force to be generated, and this is a measure for the angle of the flap that is to be set, as long as there would be static conditions. The identified interference values z influence the adjustment of the angle of the flap 7, however, so that this desired nominal or rated flap angle would not be achieved with a first adjusting manipulation. The servo following controller 12 prevents this disadvantage. By means of measuring element 8 connected to the servo following controller 12, the actual adjusting force is detected, already accounting for the interfering forces, and is provided in real time to the servo following controller 12. Additionally, the servo following controller 12 receives the still available original reference value from the primary control arrangement 13, so that the adjusting force can be corrected by the value of the interfering forces still during the adjusting process.

The invention thereby prevents a disadvantageous control process in which first a smaller-than-required angle of the flap 7 is set with a smaller available adjusting force (as a result of interference value influences), and then in a subsequent further control step, the position of the flap is re-adjusted by a further angle to compensate for the difference caused by the interference value influence. The servo following controller 12 makes possible a highly dynamic reaction to the highly dynamic forces acting on the flap 7, as well as a detection of the identified interference values in their totality. In general, the invention senses when there are higher interference forces momentarily counteracting the proper actuation of the flap, and substantially instantaneously adjusts the actuator control signal correspondingly so that the actuator applies a greater actuation force as necessary for overcoming the momentarily effective interference forces. The invention thus represents a real time control that accounts for the momentary interference forces acting on the actuation of the flap, in addition to the actual angle or position achieved by the flap.

The controllers 3 and 9 can be implemented with standard amplifier elements, each respectively having a non-inverting reference input and an inverting feedback input. The controllers 3 and 9 are cascaded to form a two stage control amplifier.

The inventive method can alternatively be carried out in a suitable computer software application, in which the two control amplifiers are effectively replaced by a software-based evaluation of the actual flap angle signal, the nominal desired flap angle, and the actual measured actuator force.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In a helicopter rotor blade arrangement including a rotor blade body, a flap that is pivotable relative to said rotor blade body, a piezoelectric actuator, a force transmitting linkage connected from an actuator output of said piezoelectric actuator to said flap, and a control arrangement that is connected and provides a control signal to a control input of said piezoelectric actuator, an improvement in said control arrangement comprising:
  a primary control with a primary feedback input and a primary control output;
  a flap position sensor that is arranged to sense an actual position of said flap, and that has a position sensor output which is connected to said primary feedback input and which is adapted to provide a flap position signal responsive and corresponding to said actual position of said flap;
  a secondary control with a secondary reference input, a secondary feedback input and a secondary control output, wherein said secondary control output is connected and provides said control signal to said control input of said piezoelectric actuator, and wherein said primary control output is connected to said secondary reference input; and
  a measuring element that is coupled with said force transmitting linkage and that has a measuring element output which is connected to said secondary feedback input.

2. The improvement in the control arrangement in the helicopter rotor blade arrangement according to claim 1, wherein said primary control further has an external control input, and further comprising an external controller having an external controller output connected to said external control input.

3. The improvement in the control arrangement in the helicopter rotor blade arrangement according to claim 2, wherein said primary control comprises a nominal flap position value transducer that has said external control input which is connected to said external controller output of said external controller.

4. The improvement in the control arrangement in the helicopter rotor blade arrangement according to claim 3, wherein said primary control further comprises a primary controller amplifier having said primary control output, said primary feedback input as an inverting input thereof, and a non-inverting input that is connected to an output of said nominal flap position value transducer.

5. The improvement in the control arrangement in the helicopter rotor blade arrangement according to claim 2, wherein said external controller has a first external signal input, and further comprising an external vibration or sound sensor connected to said first external signal input.

6. The improvement in the control arrangement in the helicopter rotor blade arrangement according to claim 5, wherein said external controller further has a second external signal input, and further comprising a flight control device that is connected and provides pilot flight control command signals to said second external signal input.

7. The improvement in the control arrangement in the helicopter rotor blade arrangement according to claim 2, wherein said external controller contains programed algorithms or circuitry for reduction of blade-vortex-interactions (BVI), for reduction of vibrations of the helicopter, or for reduction of airflow resistance of the rotor blade arrangement.

8. The improvement in the control arrangement in the helicopter rotor blade arrangement according to claim 1, wherein said secondary control comprises a secondary controller servo amplifier having said secondary reference input as a non-inverting input thereof, said secondary feedback input as an inverting input thereof, and said secondary control output.

9. The improvement in the control arrangement in the helicopter rotor blade arrangement according to claim 1, wherein said measuring element is a force measuring element that is coupled with said force transmitting linkage so as to measure a force being transmitted through said force transmitting linkage.

10. The improvement in the control arrangement in the helicopter rotor blade arrangement according to claim 9, wherein said force measuring element is a strain gage.

11. The improvement in the control arrangement in the helicopter rotor blade arrangement according to claim 10, wherein said force transmitting linkage comprises a mechanical link member interposed and connected between said actuator output of said piezoelectric actuator and said flap, and said strain gage is arranged on said mechanical link member.

12. The improvement in the control arrangement in the helicopter rotor blade arrangement according to claim 9, wherein said secondary control adjusts said control signal provided at said secondary control output responsive to and dependent on said force being transmitted through said force transmitting linkage.

13. The improvement in the control arrangement in the helicopter rotor blade arrangement according to claim 12, wherein said primary control provides and adjusts a primary reference signal at said primary control output to said secondary reference input of said secondary control responsive to and dependent on said flap position signal, and said secondary control further adjusts said control signal provided at said secondary control output responsive to and dependent on said primary reference signal.

14. The improvement in the control arrangement in the helicopter rotor blade arrangement according to claim 1, wherein said flap position sensor comprises a flap angle sensor coupled to said flap so as to sense an actual flap angle of said flap as said actual position of said flap.

15. The improvement in the control arrangement in the helicopter rotor blade arrangement according to claim 14, wherein said flap angle sensor comprises two electrical coils fixedly mounted with respect to said rotor blade body, and a metal vane that is fixed to said flap and movably arranged between said two electrical coils.

16. The improvement in the control arrangement in the helicopter rotor blade arrangement according to claim 1, wherein said flap position sensor comprises a position sensor arranged and adapted to sense a position of said force transmitting linkage connected to said flap.

17. In a helicopter rotor blade arrangement including a rotor blade body, a flap that is pivotable relative to said rotor blade body, a piezoelectric actuator, a mechanical link member that is connected and transmits an actuating force between an actuator output of said piezoelectric actuator and said flap, and a control arrangement that is connected and provides a control signal to a control input of said piezoelectric actuator, an improvement in said control arrangement comprising:
  a servo amplifier having a feedback input and having a control output that is connected and provides said control signal to said control input of said piezoelectric actuator; and a strain gage that is arranged on said mechanical link member and that has a force signal output connected to said feedback input of said servo amplifier.

18. A method of actuating a pivotable flap that is pivotally connected to a helicopter rotor blade, using a piezoelectric actuator connected to said flap by a force transmitting linkage, comprising the following steps:

a) operating said piezoelectric actuator to transmit an actuating force through said force transmitting linkage to said flap so as to pivot said flap relative to said rotor blade;

b) sensing an actual position of said flap relative to said blade and generating an actual flap position signal corresponding to said actual position of said flap;

c) sensing an actual force value of said actuating force being transmitted through said force transmitting linkage and generating an actuating force signal corresponding to said actual force value;

d) forming an actuator control signal responsive to and dependent on said actual flap position signal and said actuating force signal; and e) controlling said operating of said piezoelectric actuator by providing said actuator control signal to said piezoelectric actuator.

19. The method according to claim 18, wherein said step of forming said actuator control signal comprises applying said actual flap position signal to a feedback input of a first stage control amplifier, generating a first stage output signal in said first stage control amplifier responsive to and dependent on said actual flap position signal, applying said first stage output signal to a reference input of a second stage control amplifier, applying said actuating force signal to a feedback input of said second stage control amplifier, and generating said actuator control signal in said second stage control amplifier responsive to and dependent on said first stage output signal and said actuating force signal.

20. The method according to claim 19, wherein said step of forming said actuator control signal further comprises generating a nominal rated flap position in an external controller, and applying said nominal rated flap position as a nominal rated flap position signal through a nominal value transducer to a reference input of said first stage control amplifier, and wherein said step of generating said first stage output signal in said first stage control amplifier is carried out responsive to and dependent on said actual flap position signal and said nominal rated flap position signal.

21. The method according to claim 20, further comprising sensing vibration or sound and generating a corresponding vibration or sound signal, and providing said vibration or sound signal to said external controller, and wherein said generating of said nominal rated flap position is carried out in said external controller responsive to and dependent on said vibration or sound signal.

22. The method according to claim 18, further comprising arranging a force measuring transducer on said force transmitting linkage, and wherein said step c) is carried out by said force measuring transducer.

* * * * *

UNITED STATES PATENT AND TRADEMARK OFFICE
CERTIFICATE OF CORRECTION

PATENT NO. : 6,648,599 B2
DATED : November 18, 2003
INVENTOR(S) : Preissler

It is certified that error appears in the above-identified patent and that said Letters Patent is hereby corrected as shown below:

Title page,
Item [*] Notice: should read, -- Subject to any disclaimer, the term of this patent is extended or adjusted under 35 U.S.C. 154(b) by 20 days. --

Signed and Sealed this

Twenty-sixth Day of July, 2005

JON W. DUDAS
*Director of the United States Patent and Trademark Office*